United States Patent [19]

Matura

[11] Patent Number: 5,295,321
[45] Date of Patent: Mar. 22, 1994

[54] SELF-GRIPPING, SELF-BALANCING FISHING ROD HOLDER

[76] Inventor: Albert J. Matura, Rte. 1, Box 1636, Chandler, Tex. 75758

[21] Appl. No.: 2,280

[22] Filed: Jan. 8, 1993

[51] Int. Cl.$^5$ ............................................. A01K 97/10
[52] U.S. Cl. ..................................... 43/21.2; 248/515; 248/214; 248/231.6
[58] Field of Search ................. 43/21.2; 248/538, 514, 248/515, 518, 214, 230, 231.6, 316.6; D22/147, 148, 2.4–2.6

[56] References Cited

U.S. PATENT DOCUMENTS

| | | | |
|---|---|---|---|
| 1,967,427 | 7/1934 | Puckett | 248/538 |
| 2,176,352 | 10/1939 | McHuron | 248/518 X |
| 2,426,881 | 9/1947 | Johnson et al. | 248/515 |
| 3,835,568 | 9/1974 | Whitfield | 43/21.2 X |
| 4,366,640 | 1/1983 | Clapp | 43/21.2 |
| 4,852,291 | 8/1989 | Mengo | 43/21.2 |
| 4,877,165 | 10/1989 | Behrle | 43/21.2 X |
| 5,088,224 | 2/1992 | Gutierrez | 43/21.2 |

OTHER PUBLICATIONS

"RODPOD", LesDavis, Inc. 1984, p. 24.

Primary Examiner—Paula A. Bradley
Assistant Examiner—Jeanne M. Elpel
Attorney, Agent, or Firm—Stephen D. Carver; J. L. Mahurin

[57] ABSTRACT

An adjustable, self-gripping and self-balancing fishing rod holder comprises a mounting block adapted to be secured to the gunwale rail of a fishing boat or the like and a cooperating receiver swiveled to the block that holds the rod. The preferably wire receiver holds the handle or grip portion of a fishing rod in such a manner that its grip is increased on the fishing rod when a fish strikes. The resilient, generally rectangular mounting block comprises a rail receptive bore forward of the block's center. Two bolts secure the halves of the block together, frictionally capturing the rail therebetween. The receiver is constructed of a single continuous piece of wire forming a forward cradle, an integral notch, and a central base interconnecting the cradle to the notch. The cradle and notch are offset. A bracket spanning the base pivotally secures the receiver to the block. The bore and the pivot bolt are offset from the center of the block in opposite directions. The pivot bolt is offset approximately twice as far as the bore. By turning the receiver angularly relative to the mounting block, one may distribute the vector forces exerted upon the holder along the length of the rail. In response to a vigorous strike, tipping is resisted by the structural offsets, and the rod is more firmly gripped by the holder.

18 Claims, 4 Drawing Sheets

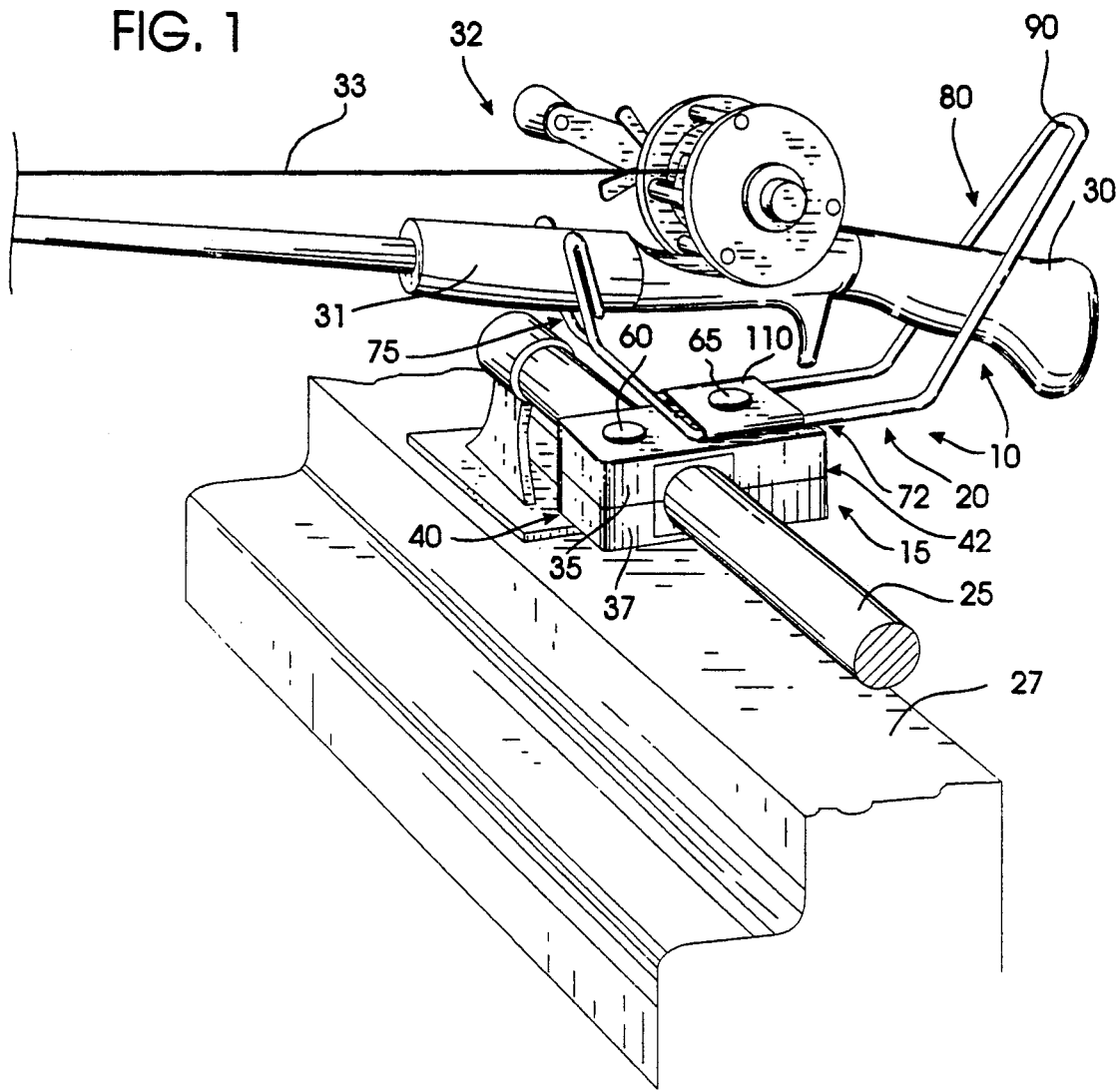
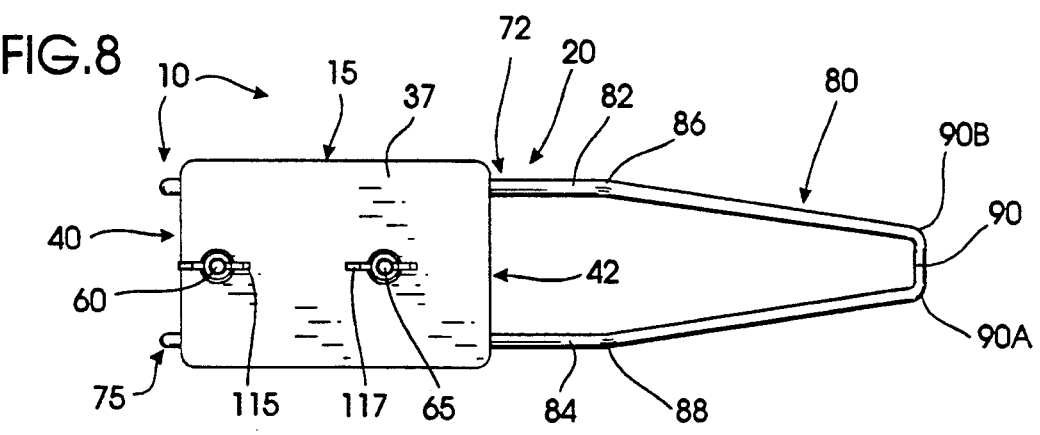

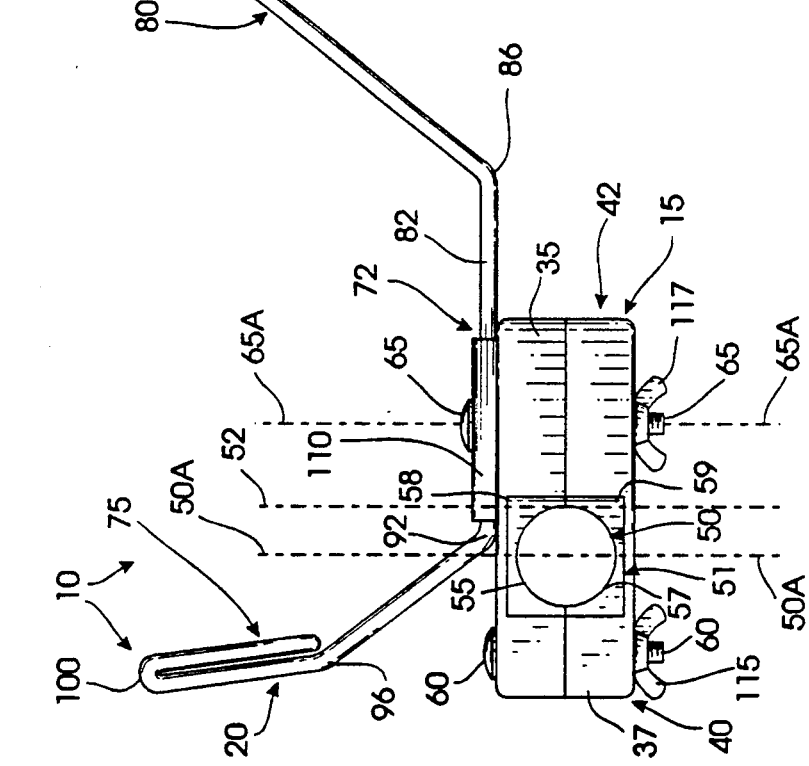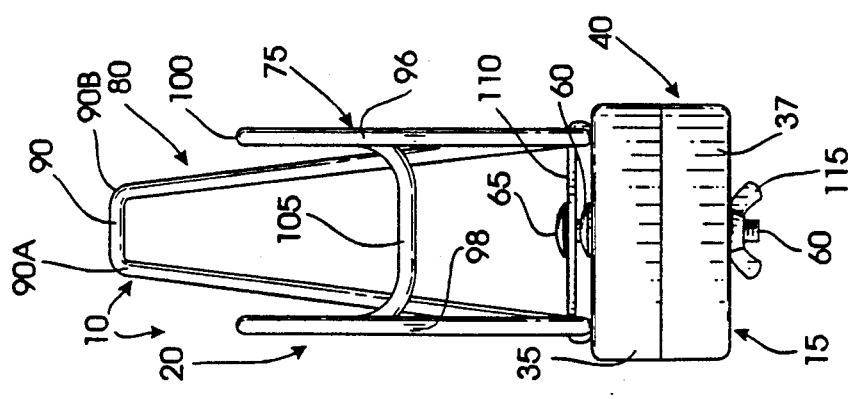

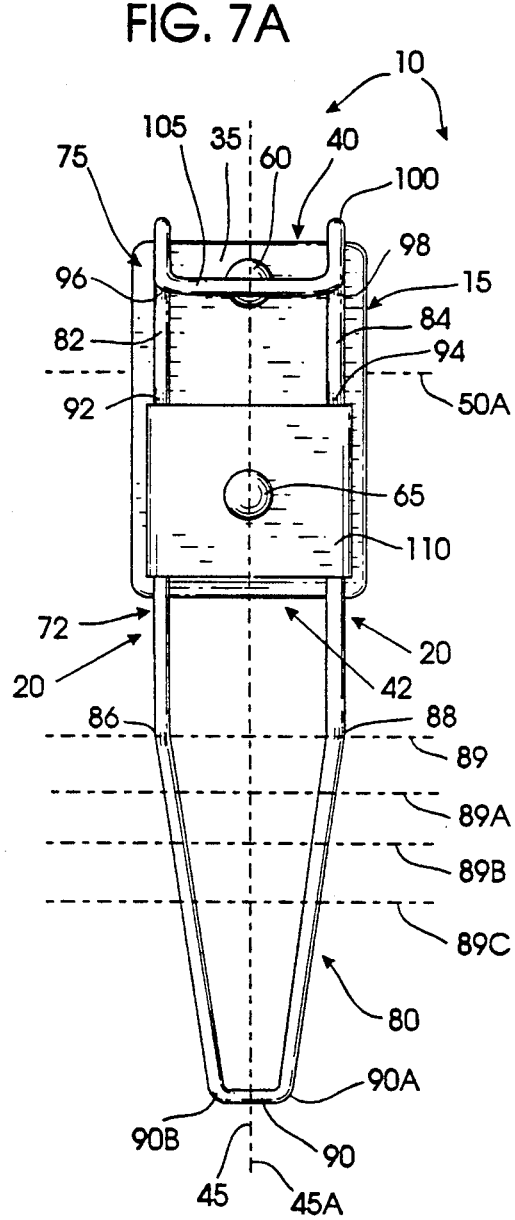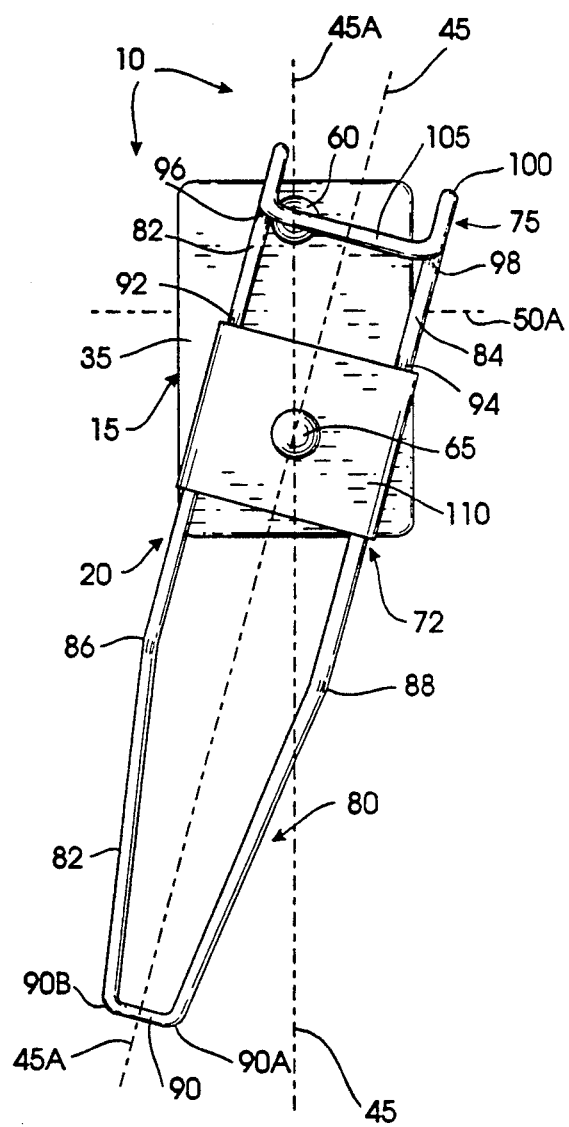

SELF-GRIPPING, SELF-BALANCING FISHING ROD HOLDER

BACKGROUND OF THE INVENTION

The present invention broadly relates to fishing rod holders. More particularly, it relates to self-gripping fishing rod holders of the type that can be conveniently secured at the periphery of a boat to conventional gunwale rails. Art within the field of this invention can be found in U.S. Class 43, Subclass 21.2 and others.

When pursuing the popular pastime of fishing, it is often desired by fishermen to employ more than one fishing rod or to perform other tasks while fishing. Hence, it is often necessary that a fishing rod go unattended, at least momentarily. In locales where it is feasible to do so, many fisherman use fishing rod holders. Such holders allow the fisherman to temporarily leave a rod unattended or to simultaneously fish with several rods.

Many types of fishing rod holders are known in the art. Some are made out of stamped steel or fashioned from wood. It is also well known in the art to provide a continuous wire framework to hold a fishing rod in a position appropriate for unattended fishing. Regardless, it is necessary to mount the rod holder on a fishing boat or other structure. Hughes U.S. Pat. No. 5,054,229 discloses a mounting bracket for a fishing rod holder. Fishing rod holders take many forms. Simko, U.S. Pat. No. 4,848,021; Koppel, 4,479,322; and McClelland 4,594,805 each disclose wooden and/or plastic structures with a forward prop and a rear retaining area for holding a fishing rod while unattended. Some fishing rod holders are constructed of a continuous piece of wire or rod. U.S. Pat. No. 4,517,761, discloses a device which exhibits a spring like resilience intended to be mounted between the rail of a boat and its gunwale.

Numerous fishing rod holders are commonly sold in sporting goods stores. *Bass Pro Shops* 1992 *Fall Catalog* includes several. A rod holder, Item 549-252, disclosed on page 258 of that reference is a continuous bent wire or rod design. More conventional rod holders are disclosed in this reference, Item 549-254 on page 259 and Items 549-428 and 549-432.

U.S. Pat. No. 2,487,094 issued to Brown on Nov. 8, 1949, illustrates a fishing rod holder intended to be inserted into the ground or mounted on a boat.

Bloodsworth U.S. Pat. No. 3,523,666 illustrates a fishing rod holder similar to Brown except it employs a ring to retain the grip of the rod.

Emery U.S. Pat. No. 3,020,014 illustrates a device similar to that of Brown however it is made out of two separate pieces of stock, and it is "padded".

It is desirous to provide a fishing rod holder which will securely hold a fishing rod while the fisherman is busy with other rods or tasks. In other words, it is important that self gripping features be incorporated into a successful design. It is also desirous to provide a fishing rod holder that is responsive to the stress placed upon it by a strike. The rod holder should employ a mount which will fix the holder in position. Ideally, a rod holder embodying these qualities will provide a progressively stronger grip on the fishing rod handle as a fish pulls on the line. Additionally, such a rod holder needs a quick release feature to facilitate use. In other words, it is necessary not only that the rod holder grip the rod while waiting for a strike, it is necessary that the rod holder secures the rod once a strike occurs. Further, it must be easy and convenient for the fisherman to disengage the rod from the rod holder to land the fish immediately after a strike.

SUMMARY OF THE INVENTION

My self gripping fishing rod holder securely holds a fishing rod while the fisherman is busy with other rods or tasks. It is responsive to the stress placed upon it by a strike, in that it provides a progressively stronger grip on the fishing rod handle as a fish pulls on the line. Yet my fishing rod holder will quickly release the rod by simply pushing down on the handle to remove it from the holder.

My adjustable self-balancing fishing rod holder is primarily comprised of a mounting block and a wire receiver. The mounting block is adapted to be secured to the gunwale rail of a fishing boat, pier railing or the like. The wire receiver is adapted to hold the handle or grip portion of a fishing rod in such a manner that tension is increased on the fishing rod when a fish pulls downward upon the fishing line. Also, these same features allow a fisherman to adjust how firmly his fishing rod is held by the receiver.

Preferably, the mounting block is comprised of a generally rectangular top and lower half. The block is preferably constructed of a resilient material such as plastic. A bore passes through the block forward of the block's center. The bore is defined by a slot defined in each half of the block. The bore receives the gunwale rail for mounting the rod holder. Two bolting orifices pass through the block to receive bolts to secure the halves of the block together.

The wire receiver comprises a single continuous piece of wire or round steel bar stock. The wire is bent to form a forward cradle, an integral notch and a central base portion interconnecting the cradle to the notch. A central orifice is defined in a bracket spanning the base. The orifice receives one of the bolts to secure the receiver to the block. The receiver pivots relative to the block at the bolt.

The receiver has two sides. Coincident first bends in the sides form an angle of approximately thirty degrees. The distance between the sides narrow forming the notch. An integral cross piece is formed by bends at the top of the notch.

Toward the front of the receiver a second pair of bends turn upward at approximately forty-five degrees. A third pair of bends orient the sides vertically, perpendicular to the base. The sides are parallel until the top of the cradle. At the top of the cradle the sides are bent one hundred-eighty degrees downward and curved inward to mate and form a cradle.

The bolts, two carriage bolts, pass through the block to secure the two halves together and to cinch the bore about the gunwale rail or similar structure. Wing nuts secure the carriage bolts. The rear most bolt provides a pivot axis for the receiver as it passes through the bracket. By loosening the rear wing nut one may rotate the receiver relative to the rail mounting the fishing rod holder. By turning the receiver more or less perpendicular to the mounting block, one may distribute the force exerted on the holder by a fish along the length of a gunwale rail.

The center of bore is offset from the center of the block. The pivot at the rear carriage bolt is offset from the center of the block in the opposite direction. The pivot is offset approximately twice as far as the center as the bore center is offset from the center of the block. Due to these offsets, stability is enhanced since tension placed on the line by a fish is balanced out. Balancing is due to the distance between the bore center and the receiver pivot axis. Furthermore, this arrangement results in cinching tension on the rail being amplified as a fish pulls the line.

The holder is easily and quickly mounted to the gunwale rail of a fishing boat or a similar structure. The upper and lower halves of the block are arranged with their slots facing the rail. The lower slot is positioned along the bottom portion of the rail. The block is bolted together by the wing nuts.

The angle of the receiver relative to the rail and block can be adjusted by loosening the rearward wing nut and turning the receiver. A fishing rod may be disposed in the holder with the handle urged firmly between the sides of the notch. The forward regions of the rod rest on the cradle, leveraging the handle into the notch. The weight of the fishing rod will help the handle engage the notch. To secure the fishing rod more snugly in place, the grip may be lifted upwardly to wedge into the notch. During a strike, the rod tip is pulled downwardly. The cradle act as a fulcrum, raising the grip butt. This results in the rod grip being further resiliently wedged between the notch sides. Further, the notch may deform outwardly somewhat as the grip moves upward thereby increasing the tension the notch places on the rod grip.

Therefore, a primary object is to provide a fishing rod holder which provides progressively tighter gripping tension on the handle of a fishing rod when a fish strikes.

Another object of the present invention is to provide a fishing rod holder wherein the fisherman may selectively adjust the tension the holder places on a fishing rod.

An object of the present invention is to provide a fishing rod holder which will nondestructively grip the handle of a fishing rod.

An object of the present invention is to provide a durable fishing rod holder which may be mounted to a variety of structures.

A related object of the present invention is to provide a fishing rod holder that is inherently balanced. It is a feature of my invention that forces which might otherwise tip over the holder are balanced by structural offsets.

An object of the present invention is to provide a fishing rod holder which will firmly hold a fishing rod, while allowing quick release of the rod.

An object of the present invention is to provide a fishing rod holder which is capable of holding a variety of fishing rod styles and types.

A related object of the present invention is to provide a fishing rod holder which can hold rods employing various types of reels or reel mounting configurations.

Another object of the present invention is to provide a fishing rod holder which places tension on the grip of a fishing rod by deforming the material of the fishing rod grip.

A related object of the present invention is to provide a fishing rod holder which places tension on the fishing rod grip by deformation of the holder, due to the elastic nature of the holder's metal construction.

A further related object of the present invention is to provide a fishing rod holder constructed of a continuous piece of round steel stock.

An object of the present invention is to provide a fishing rod holder having a mounting block and receiver arrangement which will facilitate tensioning of the mounting rod's grip on a gunwale rail as a fish strikes the line of the fishing rod held therein.

Another object of the present invention is to provide a fishing rod holder that resists the unbalancing forces a fish places upon the end of a fishing rod.

Another object of the present invention is to provide a fishing rod holder wherein the receiver is rotatable relative to its base.

A related object of the present invention is to provide a fishing rod holder wherein the stress placed on the mounting base by a fish may be distributed along the length of a mounting structure such as a rail.

A further related object of the present invention is to provide a fishing rod holder which may be mounted on a rail disposed at an angle relative to the desired positioning of the fishing rod.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 1 is a fragmentary, environmental isometric view of a preferred embodiment of my Adjustable Self-Balancing Fishing Rod Holder, shown mounted on the gunwale rail of a boat;

FIG. 4 is a side elevational view;

FIG. 5 is a front elevational view thereof;

FIG. 6 is a rear elevational view thereof;

FIG. 7A is a top plan view of my fishing rod holder illustrating the receiver generally aligned with the longitudinal axis;

FIG. 7B is a top plan view similar to FIG. 7A but illustrating the receiver disposed at an angle relative to the longitudinal axis; and, FIG. 8 is a bottom plan view thereof.

DETAILED DESCRIPTION

Figure 2:
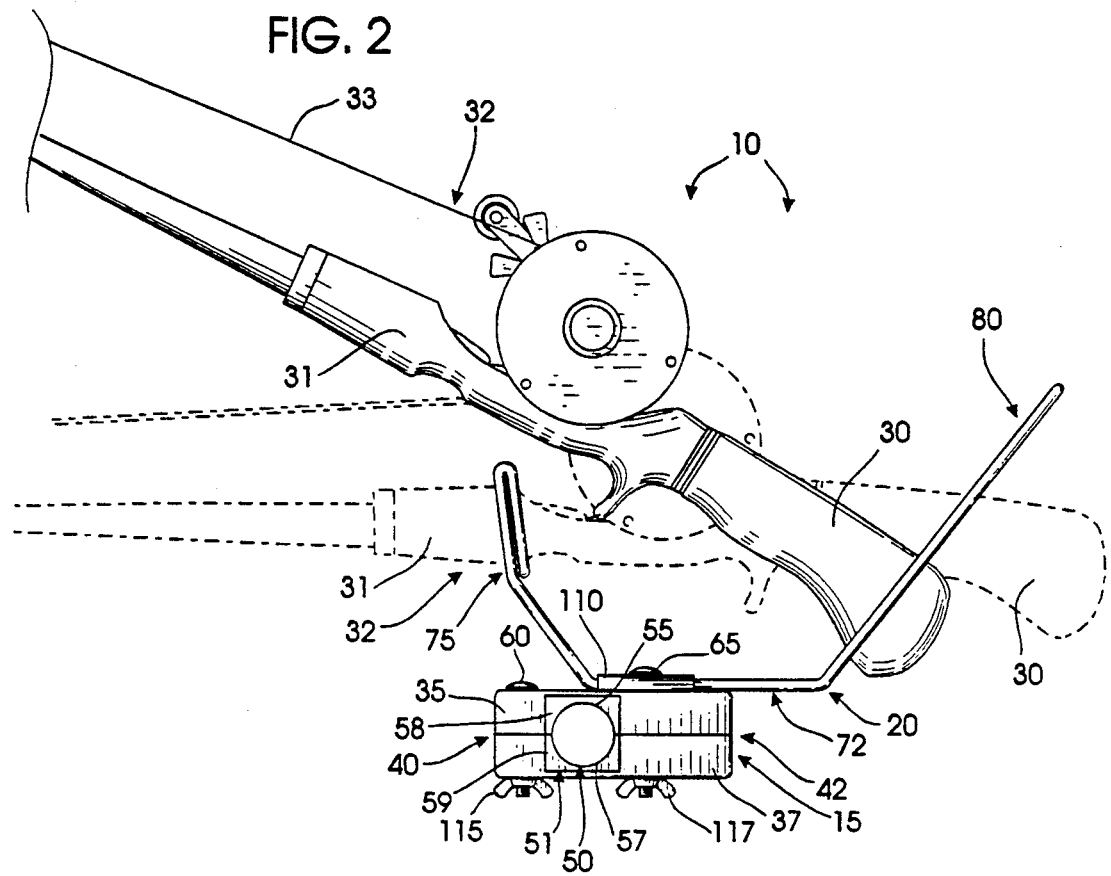
FIG. 2 is a fragmentary side elevational view of my fishing rod holder, with dashed lines indicating moved positions.

With reference now to the accompanying drawings, my adjustable, self-gripping and self-balancing fishing rod holder is generally designated by the reference numeral 10. It is primarily comprised of a generally rectangular mounting block 15 and a cooperating, adjustable receiver 20 that supports the rod. Mounting block 15 is adapted to be secured to the gunwale rail 25 of a fishing boat 27, pier railing or the like. The wire receiver 20 holds the handle or grip portion 30 of the fishing rod 32 in such a manner that gripping tension is increased on the grip 30 when a fish pulls downwardly upon the fishing line 33. The "self gripping" feature allow a fisherman to adjust how firmly his fishing rod 32 is held by the receiver 20.

Preferably the mounting block 15 is comprised of a generally rectangular top half 35 and lower half 37, each being the mirror image of the other. The block 15 is preferably constructed of a resilient material such as plastic (PVC, Polyurethane, etc.), but may be constructed of wood or metal. When united, the halves 35, 37 form the generally parallelepiped block 15, having a forward end 40, a rear end 42 and a longitudinal axis 45 extending between the ends 40, 42. A bore 50 or rectangular passage 51 perpendicular to the longitudinal axis 45 passes through the block 15. The bore 50 or rectangular passage 51 is forward of the center 52 of the block 15. The bore 50 is defined by a slot 55, 57 defined in each half 35, 37 of the block 15 or in each half 58, 59 of an insert. Each slot 55, 57 has a hemicylindrical cross section. Each insert half 58, 59 has a generally rectangular cross section. When united the slots 55, 57 form the bore 50.

The bore 50 is intended to receive a round gunwale rail 25 for mounting the rod holder 10. Alternatively, the rod holder 10 may be mounted to a square railing if the insert halves 58, 59 are omitted. Two bolting orifices are defined perpendicular to the longitudinal axis 45. Bolts 60, 65 pass trough the orifices to secure the halves 35, 37 of the block 15 together with the insert halves 58, 59 captured therebetween.

The wire receiver 20 is primarily comprised of a forward cradle 75, an integral notch 80, and a central base portion 72 interconnecting the cradle 75 to the notch 80. The wire receiver 20 is preferably constructed from a single, continuous piece of steel wire or round steel bar stock. The wire or bar stock is bent to form the structure disclosed. The somewhat elastic nature of the metal allows for a significant wedging action as described below. The receiver 20 has a longitudinal axis 45A (FIGS. 7A and 7B). The longitudinal axis of the receiver 45A is pivotal relative to the longitudinal axis of the block 45.

With reference to FIGS. 4–8, the receiver 20 comprises two sides 82, 84. The base 72 interconnects the cradle 75 and the notch 80. Coincident first bends 86, 88 in the sides 82, 84 form an angle of approximately thirty degrees which becomes the notch 80. The first bends 86, 88 form a line 89. As the two sides 82, 84 raise upwardly they also angle toward one another 89A, 89B, 89C to form the notch 80. An integral cross piece 90 formed by bends 90A, 90B at the top of the notch 80 is substantially narrower than the distance between the two bends 86, 88, where the base 72 and the notch 80 meet.

Toward the forward portion of the base 72 a second pair of coincident bends 92, 94 turn the sides 82, 84 upwardly at approximately a forty-five degree angle. The sides 82, 84 are generally parallel. A third pair of bends 96, 98 orient the sides 82, 84 vertically, perpendicularly to the base 72. The sides are parallel until the top 100 of the cradle 75 is reached. At the top 100 of the cradle 75 the sides 82, 84 are bent one hundred-eighty degrees downwardly and curved inward to mate and form the saddle 105 of the cradle 75.

A bracket 110 spans and captivates the base 72 just rear of the second set of bends 92, 94, where the sides 82, 84 turn upwardly to form the cradle 75. A central orifice is defined in the bracket 110 for passage of the second carriage bolt 65 to secure the receiver 20 to the block 15.

Fasteners preferably comprising two carriage bolts 60, 65 pass through the block 15 to secure the two halves 35, 37 together and to cinch the bore 50 about the gunwale rail 25 or similar structure. The first bolt orifice, forward of the bore 50 receives a first carriage bolt 60. The second carriage bolt 65 passes through the central orifice defined in the bracket as well as the orifices defined in the block halves 35, 37 to the rear of the bore 50. Wing nuts 115 and 117 tension the carriage bolts 60, 65, and therefore the bore 50. While the second carriage bolt 65 functions to unite the halves 35, 37 of the block 15 similar to the first bolt, it also provides a pivot axis 65A for the receiver 20. By loosening the second wing nut 117 one may rotate the receiver 20 relative to the rail 25 mounting the fishing rod holder 10. This rotates the longitudinal axis of the receiver 45A, relative to the longitudinal axis of the block 45. Thus the fishing rod 32 may be positioned as the fisherman desires on an angled gunwale rail 25. Additionally, one may angle the fishing rod 32 in situations where more of the stress placed on the fishing rod 32 by a fish needs to be distributed parallel to (i.e. along the axis of) the gunwale rail 25, rather than being perpendicular.

In other words, it may not be practical to attempt to maintain the fishing rod holder 10 in position merely by the cinching force provided through the tension placed on the wing nuts 115, 117. In that case, by turning the receiver 20 angularly relative to the mounting block 15 (FIG. 7B), one may distribute the force exerted on the holder 10 along the length of a gunwale rail 25, as vector twisting forces which might otherwise tilt the holder now are resolved along the axis of the rail.

Turning to FIG. 4 one will note that bore 50A is offset from the center 52 of the block 15. Additionally, the pivot axis 65A at the second carriage bolt 65 is also offset from the center 52 of the block 15. The pivot axis 65A is offset approximately twice as far and in the opposite direction from the center 52 as the bore center 50A is offset from the center 52. These relative offsets facilitate vector force balancing when the block 15 is secured to the gunwale rail 25. Primarily, by placing the pivot axis 65A of the receiver 20 such a great distance from the center of the bore 50A and behind the bore 50 tension placed on the line 33 by a fish is demagnified due to the distance between the bore center 50A and the receiver pivot axis 65A. Furthermore, this arrangement results in cinching tension on the rail 25 being amplified as a fish pulls the line 33.

In operation, the fishing rod holder 10 is mounted to the gunwale rail 25 of a fishing boat 27 or a similar structure such as a fishing pier rail. To do so remove the lower half 37 of the block 15. Place the slot 55 in the upper block half 35 over the rail 25. Position the slot in the lower block half 37 along the bottom portion of the rail 25. Finally pass the carriage bolts 60, 65 through the orifices disposed in the block 15 and securing them with the wing nuts 115, 117. Alternatively the insert halves 58, 59 may be removed to mount the block 15 to a square rail.

Figure 3:
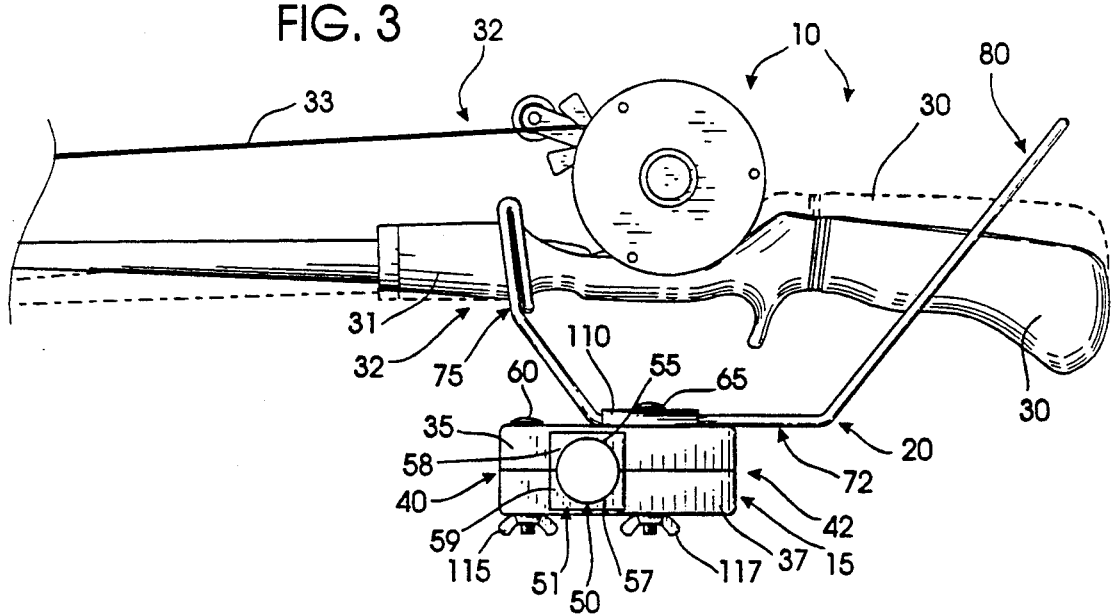
FIG. 3 is a fragmentary side elevational view thereof with moved positions illustrated in dashed lines.

The angle of the receiver 20 relative to the rail 25 and block 15 ca be adjusted by loosening the rearward wing nut 117 and turning the receiver 20. The block is clamped into place by tightening of the wing nuts. A fishing rod 32 is placed in the receiver 20 by inserting the butt of the grip 30 between the sides 82, 84 of the notch 80 or the base 72 (FIG. 2). A portion of the fishing rod forward of the grip 31 is rested upon the saddle 105 of the cradle 75 as shown in dashed lines in FIG. 2. When one removes their hand, the grip 30 of the fishing rod 32 engages the notch 80 due the weight of the fishing rod 32 extending beyond the cradle 75. To secure the fishing rod 32 in place, the grip 30 may be lifted upwardly to wedge within the notch 80 as it narrows 89A, 89B, 89C, as illustrated in FIG. 3. Fishing rods 32 conventionally employ a cushioned or resilient grip 30 intended to facilitate gripping with wet hands. Therefore it readily engages the notch 80 in such a manner that it generally will not slip by its own weight. Further, due to the lever action of the fishing rod 32 extending beyond the cradle 75 the fishing rod 32 is held firmly in place by the notch 80. Notch 80 helps facilitate holding the fishing rod 32 in place due to the elastic nature of the bar stock of which it is constructed.

If a fisherman wishes the fishing rod 32 to be even more firmly held in place, he or she may pull upwardly on the fishing rod 32 thereby separating the sides 82, 84 of notch 80 slightly to apply a gripping tension on the grip 30. This tension is provided due to the tendency of the notch 80 to return to its original shape. All three of the factors contributing to securing the rod grip 30 within the receiver 20 come into play during a strike by a fish. As the rod tip is pulled downwardly the grip 3 pivots about the cradle saddle 105 therefore raising the grip butt. This results in the rod grip 30 resiliently wedging itself between the notch sides 82, 84. Further, the notch 80 may be deformed somewhat outwardly by the grip 30 moving upwardly thereby increasing the tension of the notch 80 places on the rod grip 30.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A self-balancing fishing rod holder comprising:
   a mounting block adapted to be secured to a portion of a boat or the like, said block comprising:
   a forward end, a rear end, a center, and a longitudinal axis extending generally through said ends;
   a bore perpendicular to said longitudinal axis for receiving said portion of said boat, said bore offset from said center a preselected distance toward said forward end of said block;
   plural fastener means perpendicularly extending though said block for securing said rod holder;
   a receiver for holding the fishing rod, said receiver comprising an angled cradle extending toward said forward end adapted to support a portion of said rod and an integral, spaced-apart angled notch extending toward said rear end adapted to frictionally, wedgably receive the rod butt; and,
   bracket means penetrated by one of said fastener means for clamping said receiver to said block.

2. The fishing rod holder as defined in claim 1 wherein:
   said fastener means comprises first and second fasteners extending through said bracket means; and,
   said second fastener is offset from said center towards said rear end more than said bore is offset from said center towards said front end.

3. The fishing rod holder as defined in claim 2 wherein the ratio between the offset of said second fastener to the offset of said bore is approximately 2:1.

4. The fishing rod holder as defined in claim 3 wherein:
   said block comprises a pair of separate cooperating halves adapted to be coupled together;
   each of said fasteners comprises an elongated screw adapted to pass through said block and an associated nut to frictionally couple the two block halves together.

5. The fishing rod holder as defined in claim 4 wherein said cradle and said notch are both offset from said center, and said notch is offset substantially more than said cradle is offset thereby balancing said holder.

6. An adjustable, self-balancing fishing rod holder comprising:
   a mounting block adapted to be secured to a supporting rail, said block comprising:
   a forward end, a rear end, and a longitudinal axis extending generally through said ends;
   a center; and,
   a bore perpendicular to said longitudinal axis for receiving said rail, said bore offset from said center a first distance toward said forward end;
   first and second fasteners extending though said block perpendicular to said longitudinal axis for securing said block to said gunwale rail;
   a wire receiver for holding the fishing rod, said receiver comprising:
   an upwardly angled cradle extending toward said forward end adapted to support a portion of said rod;
   an integral, upwardly angled spaced-apart notch extending generally away from said rear end adapted to frictionally, wedgably receive the rod butt; and,
   a central portion interconnecting said cradle and said notch;
   a bracket penetrated by said second fastener for clamping said receiver to said block; and,
   wherein said second fastener is offset from said center towards said rear end more than said bore is offset from said center towards said front end.

7. The fishing rod holder as defined in claim 6 wherein:
   said block comprises a pair of halves adapted to be coupled together about said rail;
   each of said fasteners comprises an elongated screw adapted to pass through said block and an associated nut to frictionally couple the two block halves together.

8. The fishing rod holder as defined in claim 6 wherein the ratio between the offset of said second fastener to the offset of said bore is approximately 2:1.

9. The fishing rod holder as defined in claim 6 wherein:
   the receiver central portion is divided from said cradle by a first bend offset from said center towards said front; and,
   said central portion is divided from said notch by a second bend offset from said center beyond said rear.

10. The fishing rod holder as defined in claim 9 wherein said second bend is offset substantially more than said first bend is offset to facilitate balancing of the holder.

11. An adjustable self-balancing fishing rod holder comprising:
- a two piece mounting block adapted to be connected to a gunwale rail of a fishing boat, said block comprising a center, a longitudinal axis and a bore perpendicular to said axis, offset from said center toward a front of said holder, for receiving the gunwale rail;
- first and second fasteners extending though said block perpendicularly to said longitudinal axis for securing said block to said gunwale rail;
- a wire receiver for holding the fishing rod, said receiver comprising:
  - a central base portion adapted to be secured to said block;
  - a forward cradle adapted to receive a portion of said rod, said cradle angled upwardly from the receiver base;
  - an integral notch adapted to frictionally, wedgably receive a butt of said fishing rod, said notch angled upwardly from the receiving base; and,
  - wherein said central base portion interconnects said cradle and said notch; and,
- a bracket secured by at least one of said fasteners for clamping said receiver to said block, said second fastener penetrating said bracket, offset from said center toward a rear of said holder.

12. The fishing rod holder as defined in claim 11 wherein said second fastener is offset more than said bore is offset.

13. The fishing rod holder as defined in claim 12 wherein the ratio between the offset of said second fastener to the offset of said bore is approximately 2:1.

14. The fishing rod holder as defined in claim 13 wherein:
- the receiver central portion is divided from said cradle by a first bend offset from said center towards said front; and,
- said central portion is divided from said notch by a second bend offset from said center beyond said rear.

15. The fishing rod holder as defined in claim 14 wherein said second bend is offset substantially more than said first bend is offset to facilitate balancing of the holder.

16. A fishing rod holder as defined in claim 12 wherein each of said fasteners comprises an elongated screw adapted to pass through said block and an associated nut to frictionally couple the two block halves together.

17. The fishing rod holder as defined in claim 16 wherein the receiver central portion is divided from said cradle by a first bend offset from said center towards said front, and said central portion is divided from said notch by a second bend offset from said center beyond said rear.

18. A fishing rod holder as defined in claim 17 wherein the cradle is angled upwardly form the receiver base at said first bend and the notch is angled upwardly from the receiving base at said second bend.

* * * * *